United States Patent [19]
Sato et al.

[11] 3,891,770
[45] June 24, 1975

[54] PROCESS FOR RECOVERING FATS, OILS AND PROTEINS FROM WASTE LIQUOR

[75] Inventors: Takaaki Sato, Soka; Kengo Ishida, Zama, both of Japan

[73] Assignee: Kyowa Hakko Kogyo Co., Ltd., Tokyo, Japan

[22] Filed: July 23, 1973

[21] Appl. No.: 381,402

[30] Foreign Application Priority Data
July 26, 1972  Japan.............................. 47-74151

[52] U.S. Cl. ...................... 426/32; 426/56; 426/59; 426/63; 426/7
[51] Int. Cl. ............................ A23j 1/06; A23j 3/00
[58] Field of Search ....... 426/45, 63, 212, 221, 362, 426/371, 417, 364, 59, 7, 32

[56] References Cited
UNITED STATES PATENTS

| | | | |
|---|---|---|---|
| 2,953,456 | 9/1960 | Mohler et al. | 426/56 X |
| 3,041,174 | 6/1962 | Ehlert | 426/56 X |
| 3,692,538 | 9/1972 | Moss et al. | 426/417 X |

FOREIGN PATENTS OR APPLICATIONS
4,620,739  1971  Japan

*Primary Examiner*—Raymond N. Jones
*Assistant Examiner*—Esther L. Massung
*Attorney, Agent, or Firm*—Fitzgerald, Cella, Harper & Scinto

[57] ABSTRACT

Fats, oils and proteins are recovered from waste liquor resulting from processing marine products and livestock by subjecting the waste liquor to microfine aeration to produce a froth which is thereafter heated or adjusted to an alkaline pH. The froth is then treated with a protease and fats and oils are separated therefrom. The residual solution is concentrated to produce a protein rich paste.

9 Claims, No Drawings

PROCESS FOR RECOVERING FATS, OILS AND PROTEINS FROM WASTE LIQUOR

BACKGROUND OF THE INVENTION

The present invention relates to a process for the treatment of waste liquor resulting from marine life and livestock processing and more particularly to a process for separating and recovering fats, oils and proteins therefrom.

When marine life and livestock are processed, a waste liquor is produced which contains a high amount of water soluble proteins and other food products. This waste liquor has heretofore been normally discharged into water bodies such as rivers and oceans. However, with the advent of stringent anti-water pollution legislation, the direct discharge of the waste liquor is no longer possible. Accordingly, efficient processes for treating such waste liquors are now required.

During the treatment of marine products and livestock, the products are normally soaked in water to remove blood, fats and extraneous masses from the torn meat. Thus, water-soluble proteins are dissolved therein and cause an increase of the BOD of the waste liquor. The increased BOD is a major contributing factor to water pollution; and, therefore the proteins have to be separated and recovered.

Heretofore, a process has been known for recovering proteins from such waste liquors which comprises adding polyacrylates to the waste liquor to form a coagula of the proteins after adjusting the pH of the waste liquor, and forming a froth by means of microfine air bubbles generated by introducing water containing air dissolved under pressure into the waste liquor (Japanese Patent Publication No. 20739/71). However, in this process it is extremely hard to dehydrate and dry the protein coagula in the froth and it is also hard to separate and recover the fats and oils contained therein. Accordingly, there is a demand for a more efficient process which can be applied on an industrial scale.

SUMMARY OF THE INVENTION

As a result of various studies on an effective process for treating the waste liquor froth which mainly comprises proteins, the present inventors have found that the proteins in the froth formed by adding, for example, polyacrylates to the waste liquor can be solubilized either by adjusting the pH of the froth to alkalinity and then treating with protease or by subjecting the froth to thermal pretreatment to denature the froth and then treating the denatured froth with protease. In such manner, the fats and oils contained in the treated froth are readily separated. Furthermore, the present inventors have found that the residual protein solution can be processed into a paste by concentration, and the thus obtained paste is improved in respect of its ability to be preserved.

The waste liquor froth generally contains 80–85% water, 10–12 percent protein and 4–5 percent fats and oils. The froth is normally liable to be denatured owing to the large water content, and further it is hard to remove the fats and oils contained therein according to conventional methods. Thus, the treatment of the froth has been a problem. In these circumstances, the present process, according to which proteins can readily be solubilized and fats and oils can be separated at the same time, has a remarkable significance in the art of waste liquor treatment.

In accordance with the present invention, polyacrylate is added to a waste liquor containing water-soluble proteins, fats and oils, at a concentration of 10–320 ppm based on the weight of the waste liquor. The polyacrylate employed in the present process is a salt of a polyacrylic acid having a repeating structure of

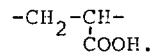

Preferably, sodium polyacrylate is employed, however, other polyacrylates such as potassium polyacrylate, ammonium polyacrylate, etc. may also be employed. Then, a froth is formed using applied pressure according to well known methods such as by microfine aeration, and the resulting froth is separated. The froth is then denatured by means of a pretreatment, and admixed with protease to carry out enzymatic decomposition. The following two methods are available for the pretreatment, either of which is applicable, depending upon the apparatus used:

1. The pH of the froth is adjusted to alkalinity by adding an alkali such as sodium hydroxide, etc. thereto.
2. The froth is heated to a temperature of 90°C, and then immediately cooled to room temperature.

About 0.1 to 0.5 percent of protease, based on the weight of the dry froth, is added to the pretreated froth, and enzymatic decomposition is carried out for several hours, while stirring the froth with heating, preferably at 30 to 35°C. As a result, the peptide bonds of the proteins constituting the froth are ruptured by enzymatic decomposition, and the proteins are solubilized. At the same time the fats and oils are caused to be more readily separable from the liquor.

As the enzyme used in the present process, endopeptidase having a strong ability to solubilize proteins is preferable. Exopeptidase may also be present. Alkali and neutral proteases obtained from microbial, animal and vegetable origins can be used and a crude enzyme preparate or enzyme culture broth are also applicable for the purposes of the invention. Such enzymes are commercially available on the market. For example, Tasinase B-12-100 (trademark, an alkali protease produced by Kyowa Hakko Kogyo Co., Ltd., Japan), Alcalase (trademark, an alkali protease produced by Novo Industri A/S, Denmark), Milezyme (trademark, an alkali protease produced by Miles Laboratories Inc., U.S.A.), Tasinase N (trademark, a neutral protease produced by Kyowa Hakko Kogyo Co., Ltd., Japan) and Bioprase SF (trademark, a neutral protease produced by Nagase & Co., Japan) are given. The decomposition temperature varies depending upon the employed enzyme, and thus an optimum temperature for the particular enzyme must be selected.

The froth, which has been subjected to enzymatic decomposition, is preferably subjected to centrifugal separation to separate and recover the fats and oils. Of course other methods known to the art for separating the fats and oils are equally applicable.

As stated above, the denaturing pretreatment of the froth can be accomplished by either adjusting the pH to alkalinity or by heating the froth. In this connection the present inventors have determined the influence of heat and pH as set forth in the following table:

Table 1

Degree of separation of fats and oils
by pH and temperature
Heating Temperature (°C)

| pH | Room temperature | 50 | 70 | 90 |
|----|------------------|-----|-----|-----|
| 3  | —                | —   | —   | +   |
| 5  | —                | —   | —   | +   |
| 7  | ±                | ±   | ±   | ±   |
| 8  | +                | +   | +   | +   |
| 9  | +                | +   | +   | +   |
| 10 | +                | +   | +   | +   |
| 11 | +                | +   | +   | +   |

+ : Separation of fats and oils is good.
± : Separation of fats and oils is rather good.
— : Separation of fats and oils is hard.

From the results set forth in the above table, in order to separate and recover fats and oils from the froth, the pH thereof must be either adjusted to alkaline or heated to about 90°C. If the pretreatment step of adjusting the pH to alkalinity is selected, it will be appreciated that the pH of the froth must be raised to from 8.0 to 11.0. Of course, for economic purposes, the minimum pH of 8.0 is generally preferred.

The residue obtained by separating the fats and oils can, after adjustment to a desired pH, be concentrated under reduced pressure or atmospheric pressure to a paste containing water in a ratio of about 30 to 15 percent. The resulting paste can be preserved at room temperature for several months without any putrefaction. On the other hand, froth, which has not been subjected to the enzymatic treatment of the invention, has no fluidity and cannot be concentrated under reduced pressure by known means.

The thus obtained paste or its mixture with brans may be commercially used as an animal feed. Otherwise, the paste may be subjected to further enzymatic or acid decomposition to produce amino acids, and thereafter utilized as a seasoning agent.

Following the present invention, fats and oils can be separated and recovered by subjecting the froth to protease treatment, and the residue obtained from separating and recovering the fats and oils can be improved regarding preservation and utilizability by concentration. Thus, the present invention provides an effective process for treating waste liquor.

Practice of certain specific embodiments of the invention is illustrated by the following representative examples:

EXAMPLE 1

In this example, 2000 kg of a waste liquor resulting from soaking torn meat of pollacks in water was adjusted to a pH of 5.5 with HCl and 500 g of sodium polyacrylate was added thereto. A froth layer was formed by introducing water maintained under applied pressure into the waste liquor, whereby 72.5 kg of a froth containing 83 percent water was obtained.

The froth was adjusted to a pH of 8.5 with sodium hydroxide, and 55 g of Tasinase B-12-100, which is a protease having an activity of 100 proteolytic unit/mg., was added thereto as protease. Enzymatic decomposition was carried out at 50°C for 3 hours with stirring. The resulting solution was sterilized by heating at 85°C for 20 minutes, and then subjected to centrifugal separation with a Scharples type centrifuge. As a result, 2.1 kg of fats and oils was separated from the fine particles and soluble fraction and recovered. The latter was concentrated under reduced pressure, whereby 14 kg of the paste (total solid content: 70 percent) was obtained.

EXAMPLE 2

In this example, 2000 kg of a waste liquor resulting from soaking whale meat in water was pretreated in the same manner as in Example 1 to obtain 35 kg of a froth containing 82 percent water.

The froth was admixed with 25 g of Tasinase B-12-100, and subjected to enzymatic decomposition at 47°C for 3 hours with stirring. The proteins were converted into fine particles, solubilized and then made fluid by the enzymatic decomposition. Then, the resulting solution was heated at 85°C for 20 minutes and subjected to centrifugal separation with a Scharples type centrifuge, whereby 1 kg of fats and oils was obtained. The resulting aqueous solution portion was concentrated under reduced pressure, whereby 7 kg of a proteinaceous paste containing water in a ratio of 30 percent was obtained. The paste was further subjected to hydrochloric acid decomposition, neutralization, filtration and pulverization, whereby a powdery seasoning agent was obtained.

EXAMPLE 3

In this example, 2000 kg of a waste liquor resulting from soaking mutton in water was pretreated in the same manner as in Example 1, whereby 29 kg of the froth containing 79 percent water was obtained.

The temperature of the froth was elevated to 90°C, kept at that temperature for 5 minutes, and then cooled to room temperature. Twenty grams of Tasinase B-12-100 was added thereto, and enzymatic decomposition was carried out at 45°C for 3 hours. The resulting decomposition solution was heated at 85°C for 20 minutes, and then subjected to centrifugal separation with a Scharples type centrifuge, whereby 1.2 kg of fats and oils was obtained. The resulting aqueous solution portion was concentrated, to produce 6.5 kg of the paste containing 25 percent water.

Practice of the invention, as presently contemplated by the inventors, is further illustrated by the following additional example.

EXAMPLE 4

In this example, 2000 kg of a waste liquor resulting from soaking torn meat of pollacks in water is pretreated in the same manner as in Example 1 except 50 g of potassium polyacrylate is used in place of 500 g of sodium polyacrylate, whereby 80 kg of a froth containing 85 percent water is obtained.

The froth is heated to 90°C by passing steam therethrough, and then allowed to stand to bring back the temperature to 55°C. 100 g of Bioprase SF, which is a protease having an activity of 50 proteolytic unit/mg., is added to the resulting froth. Enzymatic decomposition is carried out at 55°C for 3 hours with stirring. The resulting solution is sterilized by heating at 85°C for 20 minutes, and then subjected to centrifugal separation with a disk type centrifuge, whereby 3.2 kg of fats and oils is separated from the fine particles and soluble fraction and recovered. The latter is concentrated under reduced pressure, whereby 15 kg of the paste containing 40 percent water is obtained.

What is claimed is:

1. A process for the treatment of waste liquor resulting from processing marine products and livestock which comprises:
   adding polyacrylate to said waste liquor;
   subjecting said waste liquor to microfine aeration to develop a froth;
   denaturing said froth by adjusting the pH thereof to about 8.0 to 11.0;
   subjecting said froth to enzymatic decomposition by adding a protease enzyme thereto; and
   thereafter separating and recovering the fats and oils from said froth.

2. A process according to claim 1 wherein said fats and oils are separated by centrifugation.

3. A process according to claim 1 which further includes the step of concentrating the residue remaining after said separation step to a proteinaceous paste containing from about 15 to 30 percent water.

4. A process according to claim 3 wherein said paste is subjected to acid decomposition, filtration and pulverization to obtain a protein rich seasoning agent.

5. A process according to claim 1 wherein from 0.1 to 0.5 percent protease based on dry weight of froth is added to said froth.

6. A process according to claim 1 wherein said enzymatic decomposition step is carried out at a temperature of from about 30° to 35°C.

7. A process according to claim 1 wherein said polyacrylate is selected from the group consisting of sodium polyacrylate, potassium polyacrylate and ammonium polyacrylate.

8. A process for the treatment of waste liquor resulting from processing marine products and livestock which comprises:
   adding polyacrylate to said waste liquor;
   subjecting said waste liquor to microfine aeration to develope a froth;
   denaturing said froth by adjusting the pH thereof to about 8.0 to 11.0;
   subjecting said froth to enzymatic decomposition by adding from 0.1 to 0.5 percent protease enzyme based upon the dry weight of the froth;
   separating the fats and oils from said froth by centrifugation; and
   concentrating the residue to a proteinaceous paste containing from about 15 to 30 percent water.

9. A process according to claim 8 wherein said decomposition step is carried out at a temperature of from 30°C. to 35°C.

* * * * *